(12) United States Patent
Takezawa

(10) Patent No.: US 6,786,620 B1
(45) Date of Patent: Sep. 7, 2004

(54) LIGHT SOURCE DEVICE AND PROJECTOR UTILIZING THE SAME

(75) Inventor: Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/691,032

(22) Filed: Oct. 19, 2000

(30) Foreign Application Priority Data

Oct. 25, 1999 (JP) .......................................... 11-301958

(51) Int. Cl.[7] .............................................. F21V 7/20
(52) U.S. Cl. ..................... 362/345; 362/294; 362/264; 313/113
(58) Field of Search ................................ 362/294, 264, 362/345, 310; 313/112, 113

(56) References Cited

U.S. PATENT DOCUMENTS

| | | | | |
|---|---|---|---|---|
| 4,755,711 A | * | 7/1988 | Fields et al. ................. | 313/111 |
| 4,993,405 A | * | 2/1991 | Takamura ....................... | 128/6 |
| 5,621,267 A | * | 4/1997 | Shaffner et al. ............ | 313/113 |
| 5,679,453 A | * | 10/1997 | Konagaya et al. .......... | 428/327 |
| 5,789,850 A | | 8/1998 | Iwafuji et al. | |

FOREIGN PATENT DOCUMENTS

| | | |
|---|---|---|
| EP | 0 605 248 A3 | 12/1993 |
| EP | 0 605 248 A2 | 12/1993 |

OTHER PUBLICATIONS

Eugene A. Avallone & Theodore Baumeister iii, Mark's Standard Hand Book, Mc Graw Hill, 10th Edition, Table 1.2.32 (theria conductivity).*
Handbook of Industrial Refractoies Technology, Table XI.3 Thermal Conductivity of dense solid substances (Ref. 32), pp., 376, and 378.*

* cited by examiner

Primary Examiner—Sandra O'Shea
Assistant Examiner—Ali Alavi
(74) Attorney, Agent, or Firm—Oblon, Spivak, McClelland, Maier & Neustadt, P.C.

(57) ABSTRACT

A light source device of the present invention includes a light source lamp and a reflector that reflects light emitted from the light source lamp. The reflector is formed of a ceramic having a thermal conductivity of at least about 0.005 (cal/cm·sec·deg) at a temperature of 20° C. This arrangement of the light source device effectively lowers the ambient temperature of the light source lamp.

29 Claims, 5 Drawing Sheets

Fig.3

| Materials | Thermal Conductivity (cal/cm·sec·deg) (20°C) |
|---|---|
| Alumina $Al_2O_3$ | 0.04~0.07 |
| Single Crystal Sapphire $Al_2O_3$ | 0.1 |
| Forsterite $2MgO·SiO_2$ | 0.008 |
| Steatite $MgO·SiO_2$ | 0.006~0.009 |
| Zircon $ZrO_2·SiO_2$ | 0.012 |
| Titania Compounds $TiO_2$ Compounds | 0.008~0.013 |
| Silicon Carbide SiC | 0.15~0.17 |
| Silicon Nitride $Si_3N_4$ | 0.04~0.07 |
| Zirconia $ZrO_2$ | 0.009~0.014 |
| Cermet | 0.03~0.04 |

LIGHT SOURCE DEVICE AND PROJECTOR UTILIZING THE SAME

BACKGROUND OF THE INVENTION

1. Field of the Invention

The present invention relates to a light source device and a projector that utilizes the light source device to project and display images.

2. Description of the Related Art

A projector usually comprises an illuminating optical system and liquid crystal panels for modulating light from the illuminating optical system responsive to image information (an image signal). The modulated light is then projected onto a screen by a projection lens.

The illuminating optical system generally includes a light source device that has a light source lamp and a reflector having a concave surface to reflect light emitted from the light source lamp. Available examples of the light source lamp include high-pressure mercury lamps, xenon lamps, and metal halide lamps. The reflector may have a reflecting film formed on a concave surface of a hard glass.

The conventional light source device has a problem that the heat emitted from the light source lamp is not sufficiently released to the outside but remains inside the reflector (the concave portion). This is because the hard glass of the reflector functions as a heat insulator. The reflector thus undesirably increases ambient temperature of the light source lamp. The surface temperature of the reflector may be as high as about 200° C. in some cases. Such a high temperature disadvantageously shortens the life of the light source lamp or even breaks a glass tube of the light source lamp. The problem of raising the ambient temperature of the light source lamp is prominent in a light source device having a front glass at an opening of the reflector. The problem is especially significant for higher-powered light source lamps and smaller-sized light source devices.

SUMMARY OF THE INVENTION

The object of the present invention is thus to provide a technique that lowers the ambient temperature of a light source lamp in a light source device.

At least part of the above and the other related objects is attained by a light source device that includes a light source lamp and a reflector that reflects light emitted from the light source lamp. The reflector is formed of a ceramic having a thermal conductivity of at least about 0.005 (cal/cm·sec·deg) at a temperature of 200° C.

In the light source device of the present invention, the reflector is formed of a ceramic having a relatively large thermal conductivity. This arrangement effectively lowers the ambient temperature of the light source lamp.

In the light source device of the present invention, it is preferable that the ceramic has a thermal conductivity of at least about 0.004 (cal/cm·sec·deg) in a temperature range of about 0 to about 200° C.

The use of such a reflector remarkably lowers the ambient temperature of the light source lamp.

In the light source device of the present invention, it is further preferable that the ceramic is composed of any material selected among the group consisting of $Al_2O_3$, $2MgO·SiO_2$, $MgO·SiO_2$, $ZrO_2·SiO_2$, $TiO_2$ compounds, $SiC_1$ $Si_3N_4$, $ZrO_2$, and cermet.

Application of any of these ceramic materials for the reflector readily lowers the ambient temperature of the light source lamp.

In accordance with one preferable application of the present invention, the light source device further includes a transmissive front panel fitted in an opening of the reflector.

In accordance with another preferable application of the present invention, the light source device further includes a cooling device that forcibly cools down the reflector.

The use of the cooling device to cool down the reflector further lowers the ambient temperature of the light source lamp.

In accordance with still another preferable application of the present invention, the light source device further includes a power source that activates the light source lamp.

The present invention is also directed to a projector that includes: an illuminating optical system including a light source device that has any of the above configurations; an electrooptic device that modulates light emitted from the illuminating optical system in response to image information; and a projection optical system that projects a modulated light obtained by the electrooptic device.

The projector of the present invention includes the light source device having the arrangement described above. In the projector, this arrangement effectively lowers the ambient temperature of the light source lamp.

In accordance with one preferable application of the present invention, the projector further includes a driving section that supplies the image information to drive the electrooptic device.

These and other objects, features, aspects, and advantages of the present invention will become more apparent from the following detailed description of the preferred embodiment with the accompanying drawings.

BRIEF DESCRIPTION OF THE DRAWINGS

FIG. 3 is a table showing examples of ceramic material applicable for a reflector 127;

DESCRIPTION OF THE PREFERRED EMBODIMENT

A. Light Source Device

Figure 1:
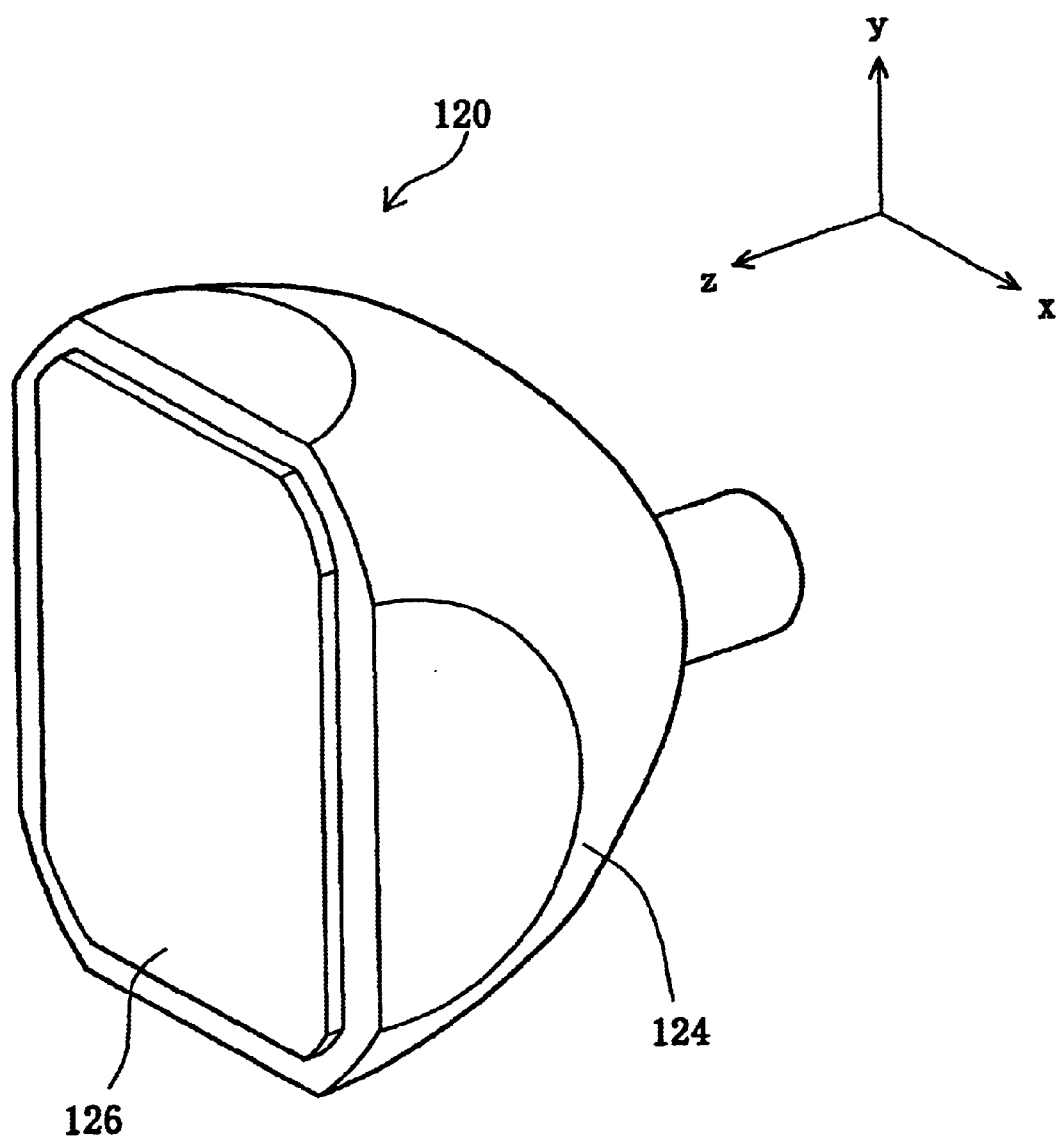
FIG. 1 is a perspective view illustrating a light source device 120 in one embodiment of the present invention.

FIG. 1 is a perspective view illustrating a light source device 120 in one embodiment of the present invention. The light source device 120 has a reflector 124 and a transmissive front glass 126. A light source lamp (not shown in FIG. 1) is incorporated in the reflector 124. The light source device 120 causes light emitted from the light source lamp to be reflected by a reflecting surface formed on the inner face of the reflector 124. The light reflected by the reflector 124 passes through the front glass 126 and is emitted outside in +z direction.

Figure 2:
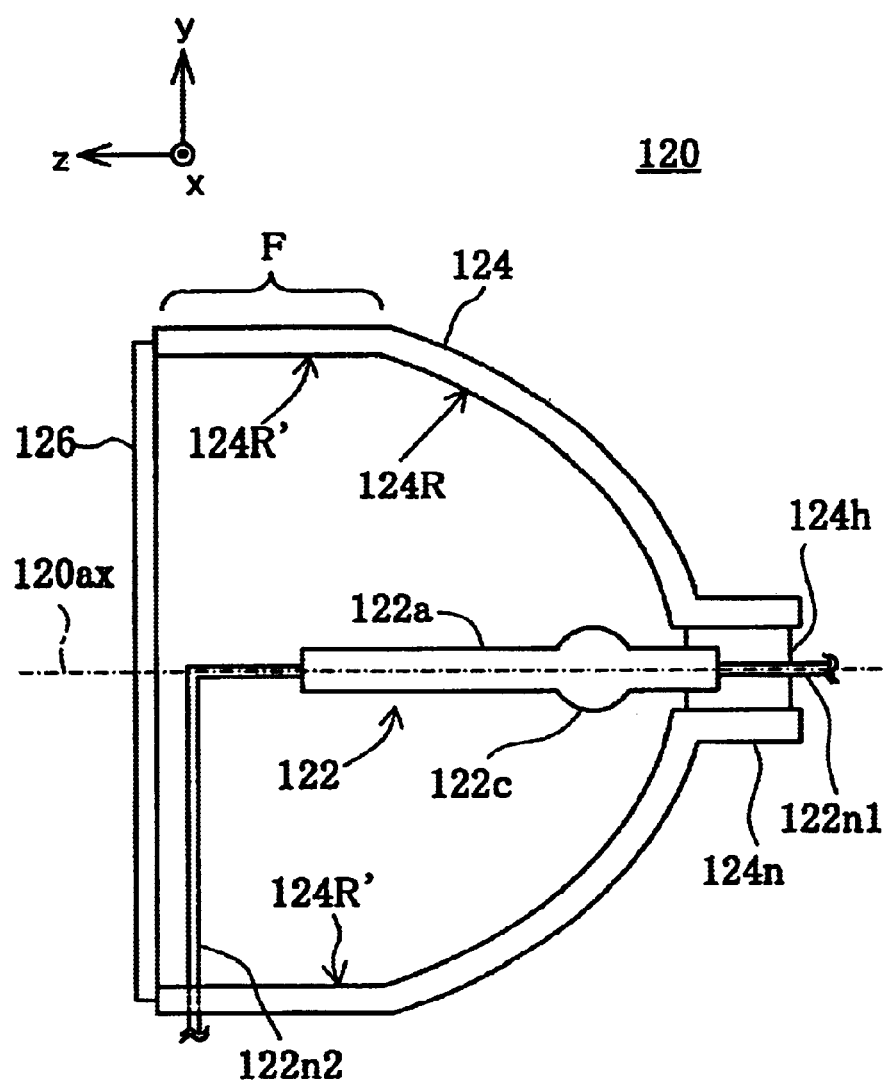
FIG. 2 illustrates the internal structure of the light source device 120 of FIG. 1.

FIG. 2 illustrates a sectional view of the light source device 120 cut on a y-z plane including a light source optical axis 120ax. The light source optical axis 120ax here represents a central axis of the light emitted from the light source device 120. As mentioned above, the light source device 120 includes the light source lamp 122, the reflector 124, and the front glass 126.

The reflector 124 is a concave mirror mainly having a concave surface 124R that forms a paraboloid of revolution symmetrical about the light source optical axis 120ax. The reflector 124 of this embodiment has four planes 124R' in a part F close to an opening thereof. Namely the inner curved portions of the concave surface 124R forming the paraboloid of revolution in the vicinity of the opening of the reflector 124 are replaced by the four planes 124R' that are parallel to the light source optical axis 120ax and perpendicular to either an x direction or a y direction.

A dielectric multi-layered film is formed on the inner faces 124R and 124R' of the reflector 124 and functions as the reflecting surface, or mirror. A metal reflecting film, such as an aluminum film or a silver film, may alternatively be formed on the inner faces 124R and 124R' of the reflector 124.

The light source lamp 122 is fixed to a neck 124n of the reflector 124 with a fixture 124h. The light source lamp 122 has an arc tube 122a, in which a pair of electrodes (not shown) are disposed along the light source optical axis 120ax. The pair of electrodes are separated by a preset distance in the vicinity of the center of a substantially spherical arc section 122c. The electrodes are electrically connected to lead wires 122n1 and 122n2, respectively. Application of a predetermined voltage to the lead wires 122n1 and 122n2 causes light to radially emit from the arc section 122c. The center of the arc section 122c is located close to the focal point of the paraboloid of revolution of the reflector 124. The light emitted from the light source lamp 122 is reflected by the reflector 124 and travels substantially parallel to the light source optical axis 120ax. In this embodiment, a high-pressure mercury lamp is used for the light source lamp 122. Metal halide lamps and xenon lamps may also be applicable for the light source lamp 122.

The front glass 126 is a transmissive plate fitted in the opening of the reflector 124. In this embodiment, a hard glass that transmits most of the visible rays emitted from the light source lamp 122 is applied for the front glass 126.

In this embodiment, the reflector 124 is formed of a ceramic. FIG. 3 is a table showing examples of ceramic material applicable for the reflector 124. Referring to FIG. 3, the examples of ceramic material include alumina ($Al_2O_3$), single crystal sapphire ($Al_2O_3$), forsterite ($2MgO \cdot SiO_2$), steatite ($MgO \cdot SiO_3$), zircon ($ZrO_2 \cdot SiO_2$), titania ($TiO_2$) compounds, silicon carbide (SiC), silicon nitride ($Si_3N_4$), zirconia ($ZrO_2$), and cermet. The cermet is obtained by compression molding a mixture of a ceramic powder and a metal powder and sintering the molded mixture. For example, the ceramic powder may be $Al_2O_3$, or $ZrO_2$, and the metal powder may be Fe, Ni, Co, Cr, or Cu. An example of the cermet is an $Al_2O_3 \cdot Fe$ compound. The thermal conductivities for the respective ceramic materials in FIG. 3 are approximate values.

All the ceramic materials shown in the table of FIG. 3 have the thermal conductivities of at least about 0.005 (cal/cm·sec·deg) at a temperature of 20° C. The hard glass used for the conventional reflector, on the other hand, has the thermal conductivity of about 0.0028 (cal/cm·sec·deg) at 20° C. Standard glass has the thermal conductivity in the range of about 0.0016 to about 0.0029 (cal/cm·sec·deg) at 20° C. Application of any of the ceramic materials shown in FIG. 3 for the reflector 124 ensures the higher thermal conductivity, than that of the conventional glass reflector, so that the heat emitted from the light source lamp 122 (FIG. 2) is readily released to the outside via the reflector 124. This arrangement effectively reduces the heat remaining 14 inside the reflector 124 (concave portion) and thereby lowers the ambient temperature of the light source lamp 122.

The alumina ($Al_2O_3$) shown in FIG. 3 has an alumina content of at least about 90% and a bulk specific gravity of at least about 3.6. Such alumina ($Al_2O_3$) is denser than the alumina having relatively small alumina content and bulk specific gravity. The bulk specific gravity is calculated by dividing a dry weight w1 of a sample by a difference between a weight w2 of the sample impregnated with water in the air and a weight w3 of the sample impregnated with water in water (=w1/(w2−w3)). Application of a relatively dense ceramic for the reflector 124 advantageously enables a homogeneous reflecting film to be readily formed on the inner faces 124R and 124R' of the reflector 124.

Cordierite ($2MgO \cdot 2Al_2O_3 \cdot 5SiO_2$) and mullite ($3Al_2O_3 \cdot 2SiO_2$) may also be used, in place of the ceramic materials shown in FIG. 3.

Figure 4:
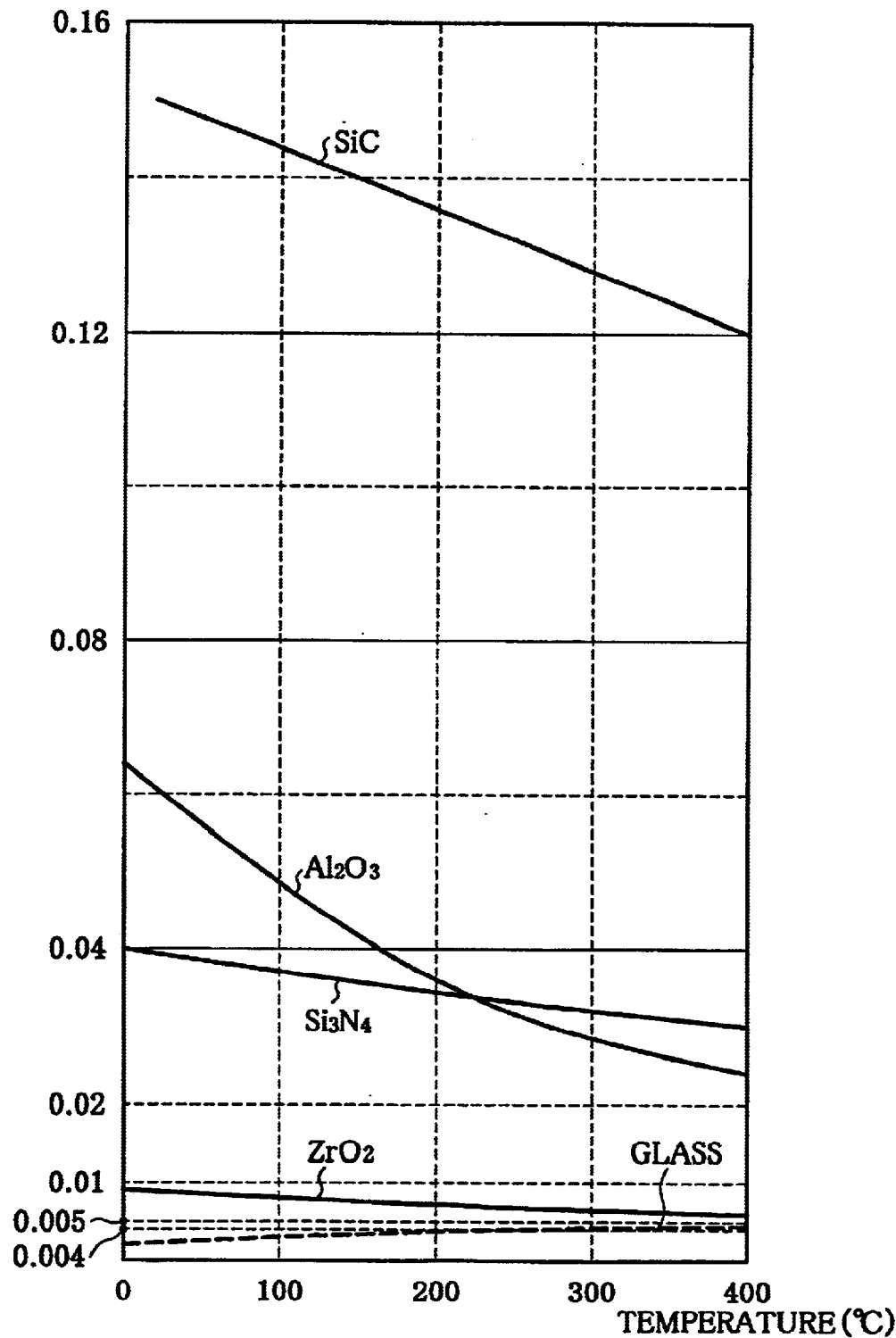
FIG. 4 is a graph showing thermal conductivity-temperature characteristic curves of various ceramic materials.

FIG. 4 is a graph showing thermal conductivity-temperature characteristic curves of various ceramic materials. The thermal conductivity-temperature characteristics are shown in the graph of FIG. 4 with regard to alumina ($Al_2O_3$), silicon carbide (SiC), silicon nitride ($Si_3N_4$), and zirconia ($ZrO_2$) shown in FIG. 3. These characteristic curves are only examples and vary, for example, with a variation in bulk specific gravity. The broken line in the graph of FIG. 4 represents the characteristic curve with regard to standard glass.

The respective ceramic materials have the thermal conductivities of at least about 0.005 (cal/cm·sec·deg) at the temperature of 20° C. and of at least about 0.004 (cal/cm·sec·deg) in a temperature range of about 0° C. to about 20° C. The standard glass, on the other hand, has the thermal conductivity in the range of about 0.0016 to about 0.0029 (cal/cm·sec·deg) at 20° C. and in the range of about 0.001 to about 0.005 (cal/cm·sec·deg) in the temperature range of about 0° C. to about 200° C. Application of any ceramic material having the thermal conductivity of at least about 0.004 (cal/cm·sec·deg) in the temperature range of about 0° C. to about 200° C. as shown in FIG. 4 for the reflector 124 enables the heat emitted from the light source lamp 122 to be desirably released to the outside via the reflector 124. This arrangement thus effectively lowers the ambient temperature of the light source lamp 122. Among the ceramic materials shown in the graph of FIG. 4, the use of silicon carbide SiC for the reflector has the greatest advantages.

As described above, the light source device of the present invention has the reflector that is formed of a ceramic having the thermal conductivity of at least about 0.005 (cal/cm·sec·deg). This arrangement enables the heat emitted from the light source lamp to be efficiently released to the outside via the reflector and thus advantageously lowers the ambient temperature of the light source lamp.

B. Projector

Figure 5:
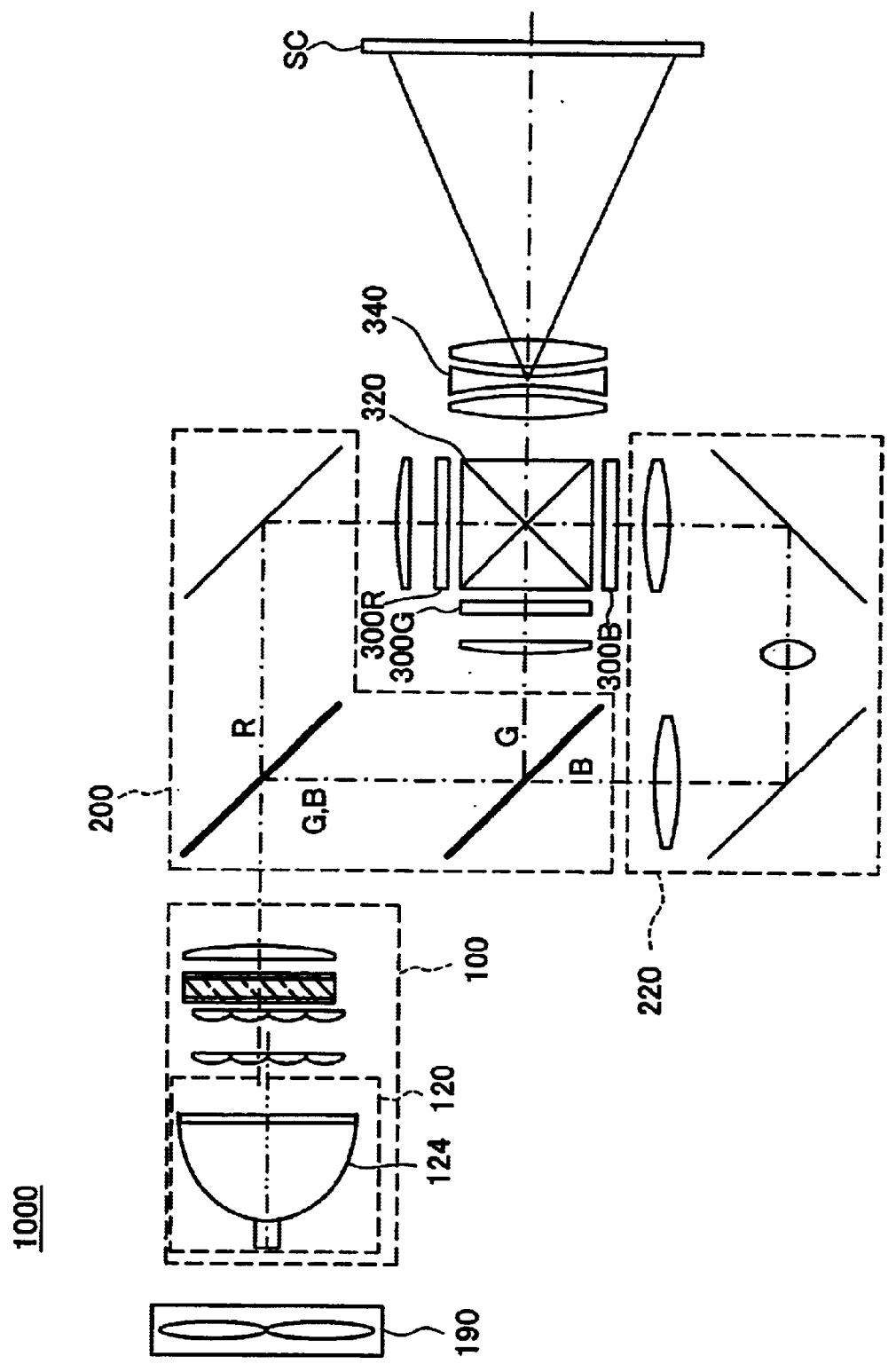
FIG. 5 schematically illustrates the structure of a projector according to an embodiment of the present invention.

FIG. 5 schematically illustrates the structure of a projector according to an embodiment of the present invention. The projector 1000 includes an illuminating optical system 100, a color light separation optical system 200, a relay optical system 220, three liquid crystal light valves 300R, 300G, and 300B, a cross dichroic prism 320, and a projection optical system 340.

The illuminating optical system 100 has a polarized light generating optical system and emits a linear polarized light beam having an adjusted polarization direction. The light emitted from the illuminating optical system 100 is separated into three color light components, red(R), green (G), and blue (B) by the color light separation optical system 200. The separated color light components are respectively modulated in response to image information by the liquid crystal light valves 300R, 300G, and 300B. Each of the liquid crystal light valves 300R, 300G, and 300B includes a liquid crystal panel corresponding to the electrooptic device of the present invention, and polarizers disposed on the light-entering side and the light-emitting side of the liquid crystal panel Each liquid crystal light valve has a driving section (not shown) that supplies image information to drive the liquid crystal panel. The light modulated responsive to the image information by the liquid crystal light valves 300R, 300G, and 300B are combined to a composite light beam by the cross dichroic prism 320 and projected on a screen SC by the projection optical system 340. An image is accordingly displayed on the screen SC. The details of the structure and function of the respective constituents of the projector as shown in FIG. 5 are described in, for example, JAPANESE PATENT LAID-OPEN GAZETTE No. 10-325954 disclosed by the applicant of the present invention and are thus not specifically explained here.

In the projector 1000 thus constructed, the light source device 120 shown in FIG. 1 is used for the light source device of the illuminating optical system 100. The light source device 120 has the reflector 124 mainly composed of the ceramic having the thermal conductivity specified above. Application of the light source device 120 to the projector 1000 thus m advantageously lowers the ambient temperature of a light source lamp (not shown). A power source (not shown) is connected to the light source device 120 for emission of the light source lamp.

A fan 190 is disposed in the neighborhood of the light source device 120 to forcibly cool down the reflector 124, thus further lowering the ambient temperature of the light source lamp.

The present invention is not restricted to the above embodiment or its modifications, but there may be many other modifications, changes, and alterations without departing from the scope or spirit of the main characteristics of the present invention. Some examples of possible modification are given below.

(1) In the light source device 120 of the above embodiment, the reflector 124 has the inner face (reflecting surface) including the concave surface 124R forming the paraboloid of revolution and the four planes 124R'. The reflector 124 is, however, not restricted to this configuration. For example, the inner face of the reflector 124 may include only a concave surface forming a paraboloid of revolution or may have a concave surface forming an ellipsoid of revolution. (2) In the above embodiment, as shown in FIGS. 1 and 2, the reflector 124 has a curved outer face as well as the curved inner face 124R. The outer surface of the reflector may, however, not be curved. For example, the reflector may be a substantially rectangular parallelepiped block having an inner face forming, for example, a paraboloid of revolution. This may facilitate the manufacture of the reflector.

(3) As shown in FIGS. 1 and 2, the light source device 120 of the above embodiment has the front glass 126. The front glass 126 may, however, be omitted to lower the ambient temperature of the light source lamp 122. In the case where the light source device 120 has the front glass 126 like the above embodiment, vent holes may be formed in part of the reflector 124 and the front glass 126. This arrangement further, lowers the ambient temperature of the light source lamp 122.

(4) The above embodiment regards the transmissive-type projector 1000, to which the light source device of the present invention is applied. The principle of the present invention is also applicable to a reflective-type projector. Here the 'transmissive-type' means that the electrooptic device functioning as the light modulator transmits light like a transmissive liquid crystal panel. The 'reflective-type' means that the electrooptic device functioning as the light modulator reflects light like a reflective liquid crystal panel. Application of the present invention to the reflective-type projector ensures the same advantages as those in the transmissive-type projector.

(5) In the above embodiment, the projector 1000 has the liquid crystal panels as the electrooptic devices. Any other electrooptic devices that generally modulate the incident light in response to image information may be utilized for the same purposes; for example, a micro-mirror light modulator. An example of the micro-mirror modulator is a DMD (Digital micro-mirror device (trade mark by TI Corp.).

Although the present invention has been described and illustrated in detail, it is clearly understood that the same is by way of illustration and example only and is not to be taken by way of limitation, the spirit and scope of the present invention being limited only by the terms of the appended claims.

What is claimed is :

1. A light source device, comprising:

a light source lamp; and a reflector that reflects light emitted from the light source lamp, wherein the reflector is formed of a ceramic having a thermal conductivity of at least about 0.005 (cal/cm·sec·deg) at a temperature of 20° C., wherein the ceramic is composed of a material selected from the group consisting of $Al_2O_3$, $2MgO·SiO_2$, $ZrO_2·SiO_2$, $TiO_2$, SiC, $Si_3N_4$, $ZrO_2$, and cermet.

2. A light source device in accordance with claim 1, wherein the ceramic has a thermal conductivity of at least about 0.004 (cal/cm·sec·deg) in a temperature range of about 0 to about 200° C.

3. A projector in accordance with claim 1, wherein the material is SiC.

4. A light source device in accordance with claim 1, further comprising:

a transmissive front panel fitted in an opening of the reflector.

5. A fight source device in accordance with claim 1, further comprising:

a cooling device that forcibly cools down the reflector.

6. A light source device in accordance with claim 1, further comprising:

a power source that activates the light source lamp.

7. A projector, comprising:

an illuminating optical system including a light source device;

an electrooptic device that modulates light emitted from the illuminating optical system in response to image information; and a projection optical system that projects a modulated light obtained by the electrooptic device, the light source device comprising:

a light source lamp; and a reflector that reflects light emitted from the light source lamp, wherein the reflector is formed of a ceramic having a thermal conductivity of at least about 0.005 (cal/cm·sec deg) at a temperature of 20° C., wherein the ceramic is composed of a material selected from the group consisting of $Al_2O_3$, $2MgO·SiO_2$, $MgO·SiO_2$, $ZrO_2·SiO_2$, $TiO_2$, SiC, $Si_3N_4$, $ZrO_2$, and cermet.

8. A projector in accordance with claim 7, wherein the ceramic has a thermal conductivity of at least about 0.004 (cal/cm·sec·deg) in a temperature range of about 0 to about 200° C.

9. A projector in accordance with claim 7, wherein the material is $Si_3N_4$.

10. A projector in accordance with claim 7, further comprising:
a transmissive front panel fitted in an opening of the reflector.

11. A projector in accordance with claim 7, further comprising:
a cooling device that forcibly cools down the reflector.

12. A projector in accordance with claim 7, further comprising:
a power source that activates the light source lamp.

13. A projector in accordance with claim 7, further comprising:
a driving section that supplies the image information to drive the electrooptic device.

14. A light source device in accordance with claim 1, wherein the material is $Al_2O_3$.

15. A light source device in accordance with claim 1, wherein the material is $2MgO \cdot SiO_2$.

16. A light source device in accordance with claim 1, wherein the material is $MgO \cdot SiO_2$.

17. A light source device in accordance with claim 1, wherein the material is $ZrO_2 \cdot SiO_2$.

18. A light source device in accordance with claim 1, wherein the material is $TiO_2$.

19. A light source device in accordance with claim 1, wherein the material is SiC.

20. A light source device in accordance with claim 1, wherein the material is $Si_3N_4$.

21. A light source device in accordance with claim 1, wherein the material is $ZrO_2$.

22. A light source device in accordance with claim 1, wherein the material is cermet.

23. A projector in accordance with claim 7, wherein the material is $Al_2O_3$.

24. A projector in accordance with claim 7, wherein the material is $2MgO \cdot SiO_2$.

25. A projector in accordance with claim 7, wherein the material is $MgO \cdot SiO_2$.

26. A projector in accordance with claim 7, wherein the material is $ZrO_2 \cdot SiO_2$.

27. A projector in accordance with claim 7, wherein the material is $TiO_2$.

28. A projector in accordance with claim 7, wherein the material is $ZrO_2$.

29. A projector in accordance with claim 7, wherein the material is cermet.

* * * * *